Oct. 27, 1964          E. HENRY-BIABAUD          3,154,061
                    INTERNAL COMBUSTION ENGINE
Filed July 13, 1962                              3 Sheets-Sheet 1

United States Patent Office 3,154,061
Patented Oct. 27, 1964

3,154,061
INTERNAL COMBUSTION ENGINE
Edmond Henry-Biabaud, Paris, France, assignor to
Societe Anonyme Andre Citroën, Paris, France
Filed July 13, 1962, Ser. No. 209,568
Claims priority, application France, July 17, 1961,
868,074, Patent 1,302,524
5 Claims. (Cl. 123—191)

This invention relates in general to internal combustion engines of the spark ignition type, that is, engines wherein a fuel mixture prepared externally of the engine is compressed in a cylinder before being ignited therein by an electric spark.

The present invention is concerned more particularly with internal combustion engines of the overhead valve type with hemishperical cylinder head, that is, those wherein the combustion chamber has the shape of a portion of a sphere.

It is known that the power output and thermal efficiency of an internal combustion engine of this type increases with the compression ratio up to a certain limit characterized by the occurrence of an abnormal combustion type, namely, the detonating or explosive combustion. This is due to the production of a pressure wave associated with the combustion wave and causing the ignition of the fuel or carburized mixture as a consequence of the pressure increment propagated thereby and also of the temperature variation by which this increment is attended. This undesired phenomenon is the cause of considerable drop in engine output and also of serious mechanical failures.

Many means and methods have already been proposed with a view to increase the resistance to detonation of these engines.

Some methods consisted in giving a geometrical configuration to the combustion chamber in order to combine a progressive combustion with a strong cooling of that portion of the gaseous charge which burns last. Experience proves on the one hand that it is advantageous to use a compact combustion chamber, that is, a chamber so designed that the quotient of the surface area of its walls to the inner volume be as small as possible, and on the other hand the advantage resulting from the positioning of the ignition plug at the hottest point so that the hot zone be not that of the last-burning gaseous charge portion.

Other means are based on the efficient turbulence of the gaseous mixture while taking advantage of the possibility of cooling any gas likely to produce an explosion.

From research works carried out on the structures of combustion chambers which are most suitable for ensuring a rapid and uniform combustion, even in the presence of low-fuel or lean mixtures, the applicant was able to draw a number of geometrical characteristics forming together the subject-matter of the present invention.

According to a first characteristic of the present invention, the cylinder of an internal combustion engine is bound at the top by a substantially semi-spherical cylinder-head in which the combustion chamber proper is formed, this combustion chamber being bound laterally by a regulated surface of frusto-conical or substantially frusto-conical configuration and at the top by two faces constituting its bottom, and internally by the semi-spherical piston crown, the exhaust valve seat orifice and the ignition spark plug hole opening in each one of said bottom faces of the chamber, respectively. The face receiving the exhaust valve seat is substantially perpendicular to the centre axis of said frusto-conical surface and the face receiving the spark plug hole is inclined to said axis. Furthermore, the plane of the inlet valve seat orifice is tangent to the lateral surface of the chamber of which the regulated structure permits the joining of the surfaces along a straight line which is both a straight line of said tangent plane and a generatrix of said chamber wall.

Thus, the flow of gaseous jets generated by the piston movements is facilitated along the cylinder-head.

According to another characteristic of this invention, the piston crown shaped to accommodate the semi-spherical configuration of the cylinder head is formed with a pair of geometrically separate oblique truncations joined along an edge line extending at right angles to the piston axis.

One of these truncations is opposite to the inlet valve. It consists of a flat face parallel to the plane of said valve and nearly contacting same in the top dead centre position. The other truncation registering with the combustion chamber proper consists of a flat face parallel to the plane of the exhaust valve. According to a preferred form of embodiment of this invention, said last-named truncation is formed with a shallow recess in the region opposite the spark plug in order to provide the maximum combustion volume for the flame front when the ignition begins.

According to a third characteristic of this invention, the exhaust valve and the spark plug are situated in the combustion chamber in a plane at right angles to the plane formed by the axes of the two inlet and exhaust valves.

The novel features and the advantages of this invention will be better understood from the following description if reference is made to the attached drawings illustrating by way of example only a typical embodiment of the invention. In the drawings.

Figure 1:
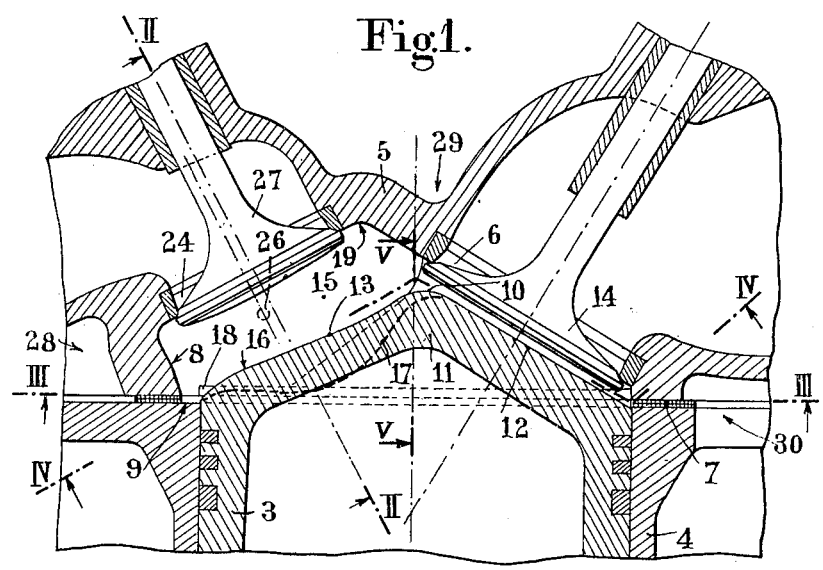
FIGURE 1 is a longitudinal section with an offset portion according to the line I—I of FIG. 4.

Referring now to the drawing, the engine illustrated therein comprises a piston 3 movable in the bore of a cylinder 4 provided with a semi-spherical cylinder-head 5. This cylinder-head 5 is tightened on top of the cylinder 4, a gasket 7 being interposed therebetween. As will be made clear presently, the edges 8 of the cylinder head and 9 of the cylinder are not coincident with each other across the combustion chamber, due to the recessed configuration of wall 8.

The piston head 3 inscribed in a substantially semi-spherical top 11 corresponding in shape to the interior of the cylinder head is formed with two oblique truncations 12, 13. The first truncation 12 is flat and opposite the circular inlet valve seat orifice 6 closed by the inlet valve 14, this truncation nearly contacting the inlet valve 14 when the piston is at top dead centre, so that only a very thin gaseous layer is left therebetween in this position.

Thus, the gaseous mixture is strongly throttled and its turbulence is as great as that developed within the cylinder during the compression stroke.

Moreover, the final phase of the combustion is localized in this zone which, as a consequence of its narrowness, has an exceptionally high and therefore favorable surface to volume ratio.

The other truncation 13 is opposite the combustion chamber proper 15. This truncation consists of a substantially plane surface 16 formed opposite the spark plug hole with a cavity shown only by the broken line 17 in FIG. 1. With this arrangement when the combustion begins the volume available for the flame front is substantially increased.

In the top dead centre position the outer edge 18 of truncation 13 is level with the recessed portion 8.

The two truncations 12 and 13 are joined to each other through a convex surface portion 10 of a shape determined in the manner known to those conversant with the art, thus avoiding the development of thermal stress in the piston head.

The combustion chamber 15 formed in a cavity 19 of the cylinder-head 5 is very nearly of hollow frusto-conical configuration widening out toward the piston and having its two bases bound by elliptic curves 20 and 21. The plane of symmetry of this chamber is that passing in FIG. 2 through the major axes of 20 and 21. Two faces 22, 23 extending at right angles to this plane of symmetry constitute the bottom of the combustion chamber. The face 22 which is substantially perpendicular to the centre axis of this chamber has a circular orifice 24 formed therein for receiving the exhaust valve seat engageable by the exhaust valve 27. The other face 23 is slightly inclined relative to the face 22 and has an orifice 25 formed therein for receiving the ignition device 26, generally a spark plug.

Figure 2:
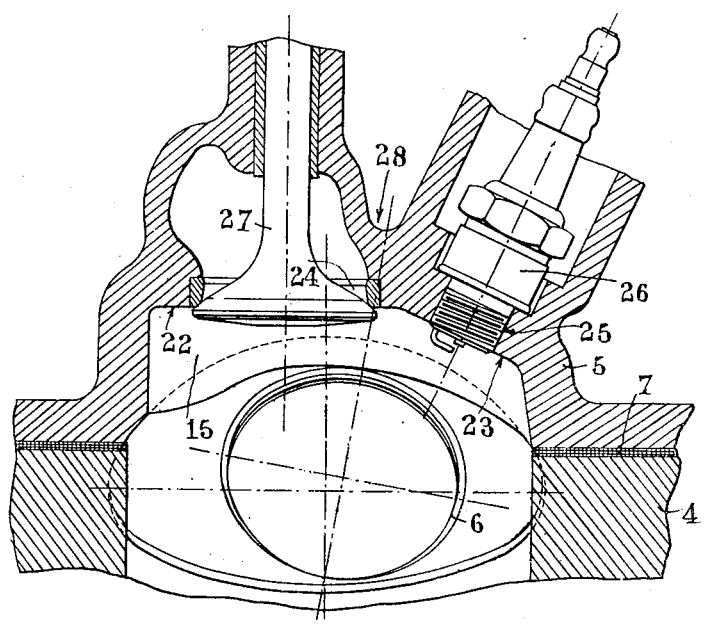
FIGURE 2 is a section taken upon the line II—II of FIG. 1 along a plane parallel to the cylinder axis and containing the planes of the exhaust valve and the spark plug.
Figure 3:
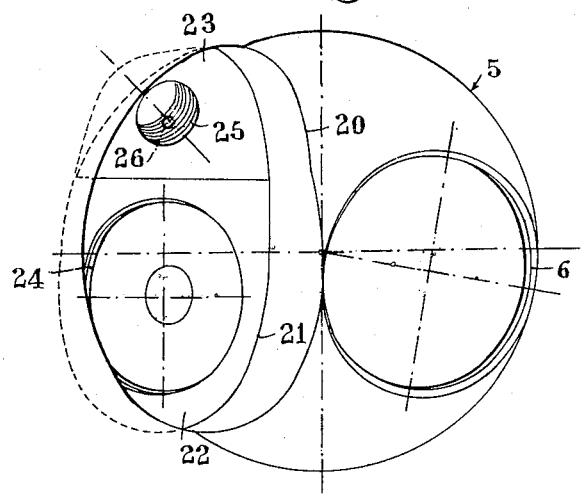
FIGURE 3 is a section taken upon the line III—III of FIG. 1, showing the bottom of the cylinder head, the piston being removed for the sake of clarity.
Figure 4:
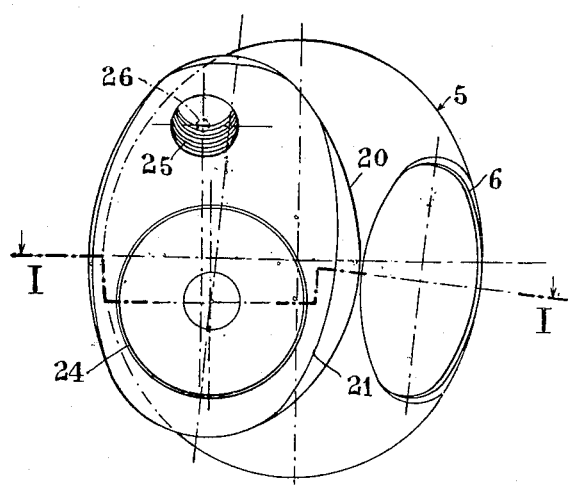
FIGURE 4 is a section taken upon the line IV—IV of FIGURE 1 which shows likewise the bottom of the cylinder-head.
Figure 5:
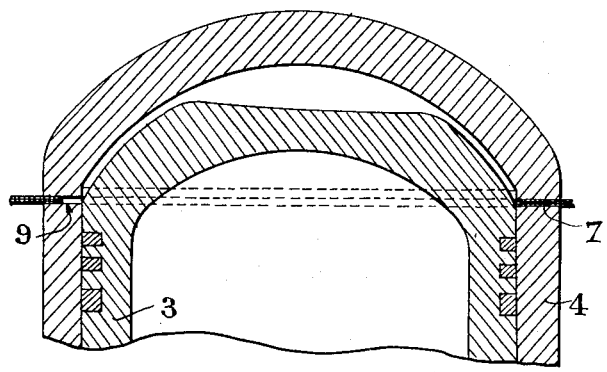
FIGURE 5 is a sectional view of the piston, the section being taken upon a diametral plane perpendicular to that of the section of FIGURE 1.

The plane of FIG. 2 which receives in common the exhaust valve axis and the spark plug axis extends at right angles to the axis of the two inlet and exhaust valves 14 and 27, respectively.

On the other hand, the plane of the inlet valve seat orifice is tangent to the lateral regulated surface of chamber 15.

When machining this chamber, the conical surface portion adjacent to the contact generatrix is formed with a radius of curvature long enough to permit the assimilation of this surface with a plane element in this region.

With the combustion chamber arrangement of this invention liners and spaces 28, 29, 30 of adequate volume can be provided for circulating the cooling fluid both around the spark plug 26 and around the exhaust valve 27. It permits notably of forming liners and circulating chambers of constant wall thickness, and therefore of avoiding excess thicknesses likely to produce thermal stress. The recessed portion 8 of the cylinder-head at the level of gasket 7 is provided to this end.

This geometrical design of the combustion chamber is attended by the following advantages:

(1) The ratio $$\frac{\text{chamber surface}}{\text{chamber volume}}$$

is particularly low due to the compactness of the chamber, resulting in a reduced flame path and short combustion time.

(2) The ratio $$\frac{\text{end-of-combustion zone surface area}}{\text{end-of-combustion zone volume}}$$

is particularly high due to the relative positions of the piston and inlet valve in the top dead centre position, thus permitting on the one hand a strong throttling and a high degree of turbulence of the gas during the compression and, on the other hand, a trouble-free combustion end in said zone as a consequence of the strong cooling of the combustion tail.

(3) A high temperature is obtained at the level of the spark plug since the latter is in the vicinity of the exhaust valve.

(4) Any stagnant gas pockets are eliminated due to the provision of the joining surface between the plane of the inlet valve seat orifice and the wall of the combustion chamber. During the compression stroke, the gas from the zone lying between the piston and the inlet valve is scavenged, without any interference, in the direction of the combustion chamber proper.

Due to these various advantageous features, the operation of an engine constructed according to the teachings of this invention is satisfactory at high-compression ratios, irrespective of the type of feed contemplated (fuel injection or fuel evaporation).

What I claim is:

1. A spark-ignition internal combustion engine comprising a cylinder closed at the top by a cylinder-head having a chamber of substantially semi-spherical configuration, in which the combustion chamber is formed, wherein said combustion chamber proper is bound laterally by a substantially frusto-conical configuration, at the top by two faces in which an exhaust valve aperture and a spark plug aperture open respectively, and at its lower portion by a semi-spherical crown of a piston and the plane of an inlet valve seat is tangent to a lateral surface of said combustion chamber.

2. An engine as set forth in claim 1, wherein said semi-spherical piston crown is formed with two oblique flat truncations facing the one, the inlet valve seat, and the other, the combustion chamber proper, said other truncation having a shallow cavity formed therein opposite the spark plug aperture.

3. An engine as set forth in claim 2, wherein said exhaust valve aperture and said spark plug orifice lie in said combustion chamber in a plane extending at right angles to that formed by the axes of said inlet valve seat and said exhaust valve aperture.

4. A machine as set forth in claim 3, wherein said inlet and exhaust valve chambers are adjacent to a common diametral plane of the cylinder.

5. A spark-ignition internal combustion engine comprising a cylinder, a cylinder head closing said cylinder at the top and formed with an inner surface of which one portion is of part-spherical configuration and which, on one side of a diametral plane, has a relatively large circular aperture formed therein, the axis of said aperture lying in another diametral plane substantially at right angles to said first diametral plane and extending substantially up to the top of said part-spherical portion, said cylinder-head surface having formed therein on the side opposite to said first diametral plane a cavity having substantially frustoconical lateral walls with their common axes directed substantially in said other diametral plane and extending substantially up to the top of said part-spherical portion where it is tangent to the plane of said circular aperture, said cavity having a flat bottom disposed substantially at right angles to the axis of said frustoconical lateral wall and being formed with another circular aperture, and rising towards said lateral wall in the form of an inclined small face in which a tapped hole is formed; an inlet valve mounted in said first circular aperture in the inner surface of the cylinder head, an exhaust valve mounted in the other circular aperture of the inner surface of said cylinder head, an ignition spark plug screwed in said tapped hole formed in said other circular aperture of the cylinder head, and a piston slidably mounted in said cylinder, said piston having an outer contour of part-spherical configuration corresponding in shape to the part-spherical inner contour of said cylinder head and which, on the side of said first diametral plane, has a flat circular face formed therein which is so shaped and disposed as to register with said inlet valve when said piston is in its top dead center position and which, on the side opposite to said first diametral plane, has a slightly concave surface formed therein to constitute a combustion chamber in the said cavity in the inner surface of the cylinder head when said piston is in its top dead center position.

References Cited in the file of this patent

UNITED STATES PATENTS

| | | |
|---|---|---|
| 2,214,941 | Taub | Sept. 17, 1940 |
| 2,580,951 | Pescara | Jan. 1, 1952 |
| 2,887,101 | Nallinger | May 19, 1959 |
| 2,957,460 | Klobe | Oct. 25, 1960 |
| 2,957,461 | Carpentier et al. | Oct. 25, 1960 |

FOREIGN PATENTS

| | | |
|---|---|---|
| 1,131,285 | France | Oct. 15, 1956 |